United States Patent [19]

Comforti

[11] Patent Number: 5,138,566
[45] Date of Patent: Aug. 11, 1992

[54] FRACTIONAL/DECIMAL/DIGITAL CONVERTING CALCULATOR

[76] Inventor: John Comforti, 83-60 265th St., Floral Park, N.Y. 11004

[21] Appl. No.: 590,764

[22] Filed: Oct. 1, 1990

[51] Int. Cl.$^5$ .............................................. G06F 3/00
[52] U.S. Cl. ........................... 364/709.07; 364/710.08
[58] Field of Search ...................... 364/709.07, 709.12, 364/710.08, 715.07

[56] References Cited

U.S. PATENT DOCUMENTS

| | | | |
|---|---|---|---|
| 3,973,113 | 8/1976 | Goldsamt | 364/709.07 |
| 4,064,398 | 12/1977 | Kishimoto et al. | 364/709.07 |
| 4,081,859 | 3/1978 | Goldsamt et al. | 364/709.07 |
| 4,100,603 | 7/1978 | Boyd | 364/709.07 |
| 4,475,165 | 10/1984 | Rizk et al. | 364/709.07 |
| 4,488,250 | 12/1984 | Lipsey et al. | 364/709.07 |
| 4,545,022 | 10/1985 | Hughins | 364/709.07 |
| 4,744,044 | 5/1988 | Stover et al. | 364/737 |
| 4,800,514 | 1/1989 | Earle | 364/715.07 |
| 4,860,233 | 8/1989 | Pitchford | 364/709.07 |
| 4,872,112 | 10/1989 | Hungerford | 364/709.07 X |

FOREIGN PATENT DOCUMENTS 1173164  8/1984  Canada ............................ 364/709.07

*Primary Examiner*—Tan V. Mai
*Attorney, Agent, or Firm*—Michael I. Kroll

[57] ABSTRACT

A Production Pal is provided that permits a user to perform calculations directly upon fractional data. Input to the Production Pal can be either a length expressed as a mixed fraction or rectangular measurements (length × width). The desired size, original size, and scaling factor (decimal or percent) are variables that can be manipulated. The circuit architecture employed utilizes a central processor unit, read only memory, random access memory, keyboard, and display. A fractional computation unit is a unique contribution. The keyboard contains numerous keys devoted to direct fractional keystroking. The scaling capabilities are also a unique contribution.

5 Claims, 3 Drawing Sheets

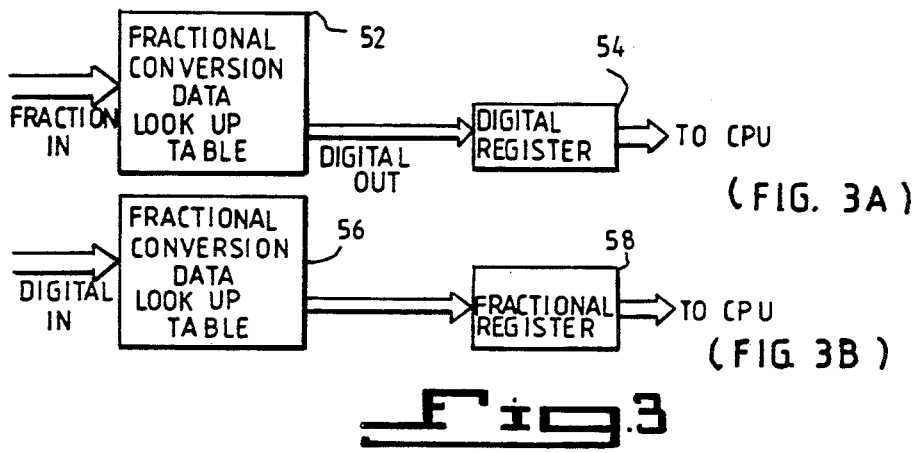
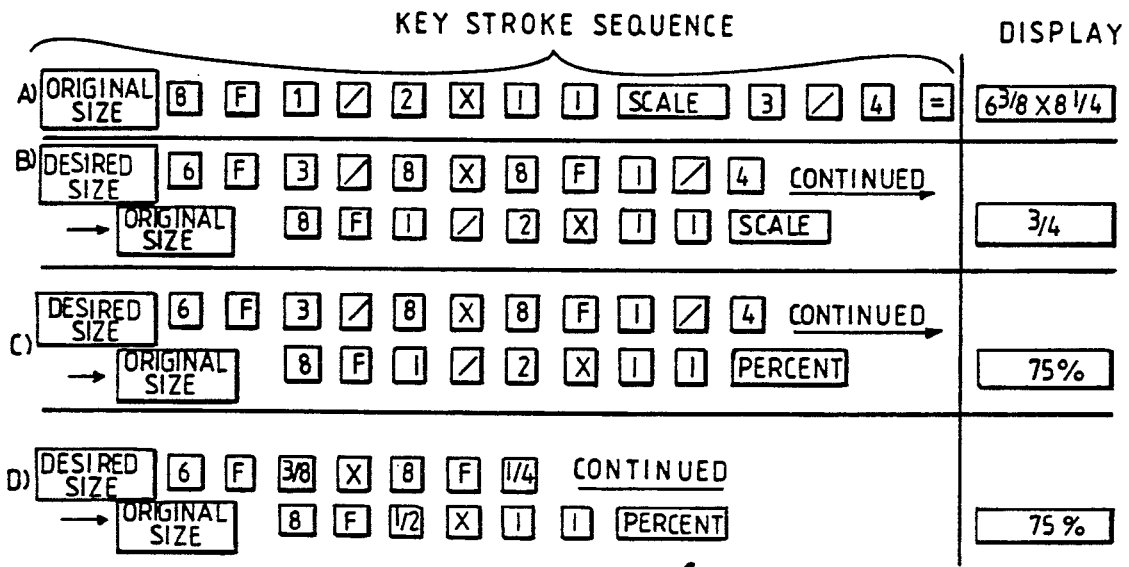

FRACTIONAL/DECIMAL/DIGITAL CONVERTING CALCULATOR

BACKGROUND OF THE INVENTION

The instant invention relates generally to the field of electronic calculator, and, more specifically to those computational devices that provide both decimal and fractional computation.

At the present state of the art calculators perform mainly decimal computations including addition, subtraction, multiplication and division Mass production calculators include functions such as percentage and square roots as well as various memory and storage features Scientific calculators provide advanced mathematical functions such as exponentials, integral calculus, and statistics, and can even graph mathematical functions. Special purpose calculator provide analysis capabilities for almost every discipline including engineering, accounting, and computer programming.

In the United States the effort to move from English Units (pounds, feet, and seconds) to metric (kilograms, meters, and seconds) has largely failed due to the cost of converting both measuring instruments and "standard size" objects including milled lumber, hardware of various types, tire sizes, etc. The English system is therefore an essential part of commerce and product dimensions will continue to be measured in fractional parts of inches and feet.

At present there are no calculators that directly work in fractional dimensions while also providing scaling functions. The user is forced to convert back and forth between fractions and decimals, truncating the results where necessary. This is particularly difficult in those applications where measurements need to be scaled. For example, a framer working from architectural drawings will need to scale the dimensions from the architectural drawings prior to performing calculations. Errors made in these conversions can be time consuming, expensive, and can even jeopardize public health and safety.

SUMMARY OF THE INVENTION

It is, therefore, a primary object of the invention to provide a Fractional/Decimal/Digital Converting Calculator that allow the user to perform all calculation in fractional form without reverting to decimal to fractional conversions or vice versa.

Another object of the invention is to provide a Fractional/Decimal/Digital Converting Calculator that allows the user to input original sized rectangular measurements (in fractional form) and automatically scale that measurement by some scalar numerical factor where the output is also in fractional form.

Another object of the invention is to provide a Fractional/Decimal/Digital Converting Calculator that allows the user to input original sized rectangular measurements (in fractional form) and automatically scale that measurement by some percentage factor where the output is also in fractional form.

Yet another object of the invention is to provide a Fractional/Decimal/Digital Converting Calculator that allows the user to input desired sized rectangular measurements (in fractional form), specify a numerical or percentage scale factor and automatically produce the desired measurements also in fractional form.

A still further object of the invention is to provide a Fractional/Decimal/Digital Converting Calculator that provides fractional keys for the most commonly used fractions.

A yet further object of the invention is to provide a Fractional/Decimal/Digital Converting Calculator that is inexpensive to fabricate, light weight, and operates in a manner closely analogous to that of a conventional calculator thereby making it easy to use.

Yet another object of the invention is to provide a Fractional/Decimal/Digital Converting Calculator that allows a user to input single digit numbers in cases where only one rectangular dimension is to be scaled.

A final object of the invention is to provide a Fractional/Decimal/Digital Converting Calculator that allows the user to work not only in fractional measurement units, but also in decimal or metric, units such as millimeters, kilometers, etc.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

Figure 2:
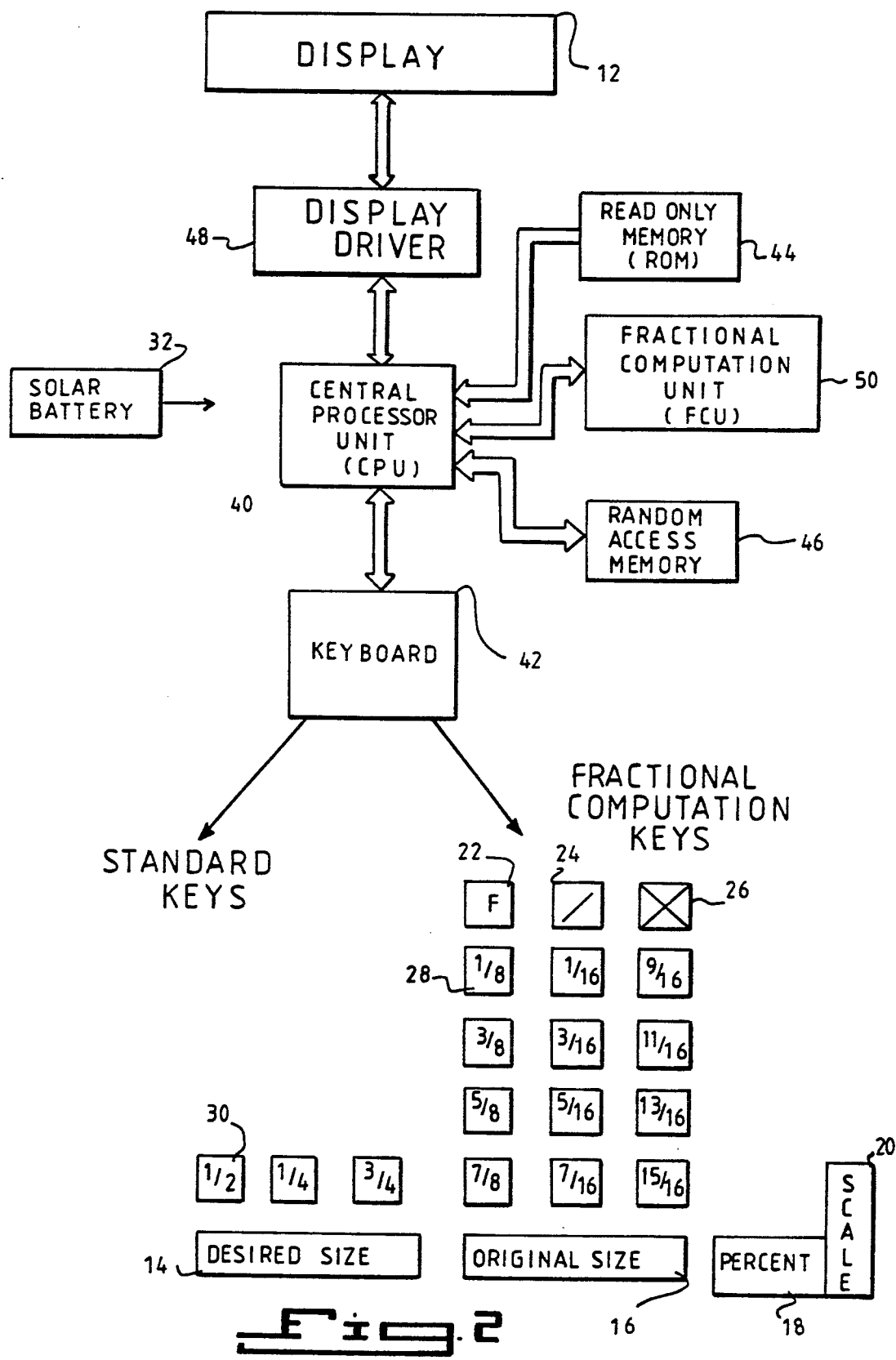
FIG. 2 is a electronic block diagram of the invention illustrating data flow. The fractional computation keys (those not contained in a conventional calculator are shown.

FIG. 3 is an electronic block diagram showing the components of the fractional computation unit illustrated in FIG. 2. FIG. 3A illustrates the conversion of fractional data to digital data. FIG. 3B illustrates the conversion of digital data to fractional data.

FIG. 4 is a diagram illustrating the operation of the invention. The keystrokes at the left produce the display show on the right. Examples C and D are equivalent except that the fractions are entered using the fractional computation keys instead of the standard keys.

FIG. 5 is another diagram, similar to FIG. 4 except that only a single dimension is input. In A) the data is input in decimal form and in B) the data is input in mixed fractional form.

FIG. 6 is another diagram, similar to FIGS. 4 and 5 except that the available data is the original size, expressed as a decimal measurement and the desired size, also expressed as a decimal measurement. The result is expressed as a percentage reduction.

LIST OF REFERENCE NUMERALS

10—CASE
12—DISPLAY (LIQUID CRYSTAL DISPLAY, OR LIGHT EMITTING DIODE DISPLAY, OR ELECTROFLOURESCENT DISPLAY, OR GAS PLASMA DISPLAY, OR ANY OTHER FLAT PANEL DISPLAY)
32—SOLAR BATTERY
40—CENTRAL PROCESSOR UNIT INTEGRATED CIRCUIT (COMPLETE INSTRUCTION SET COMPUTER- CISC OR REDUCED INSTRUCTION SET- RISC)

42—KEYBOARD
44—READ ONLY MEMORY INTEGRATED CIRCUIT (PROM, EPROM, EEPROM)
46—RANDOM ACCESS MEMORY INTEGRATED CIRCUIT(DRAM OR SRAM)
48—DISPLAY DRIVER INTEGRATED CIRCUIT (SELECTED FOR DISPLAY TYPE)
50—FRACTIONAL CONVERSION DATA LOOKUP TABLE INTEGRATED CIRCUIT (CUSTOM APPLICATION SPECIFIC CHIP)
54—DIGITAL REGISTER INTEGRATED CIRCUIT
56—FRACTIONAL REGISTER INTEGRATED CIRCUIT

DETAILED DESCRIPTION OF THE PREFERRED EMBODIMENTS

Figure 1:
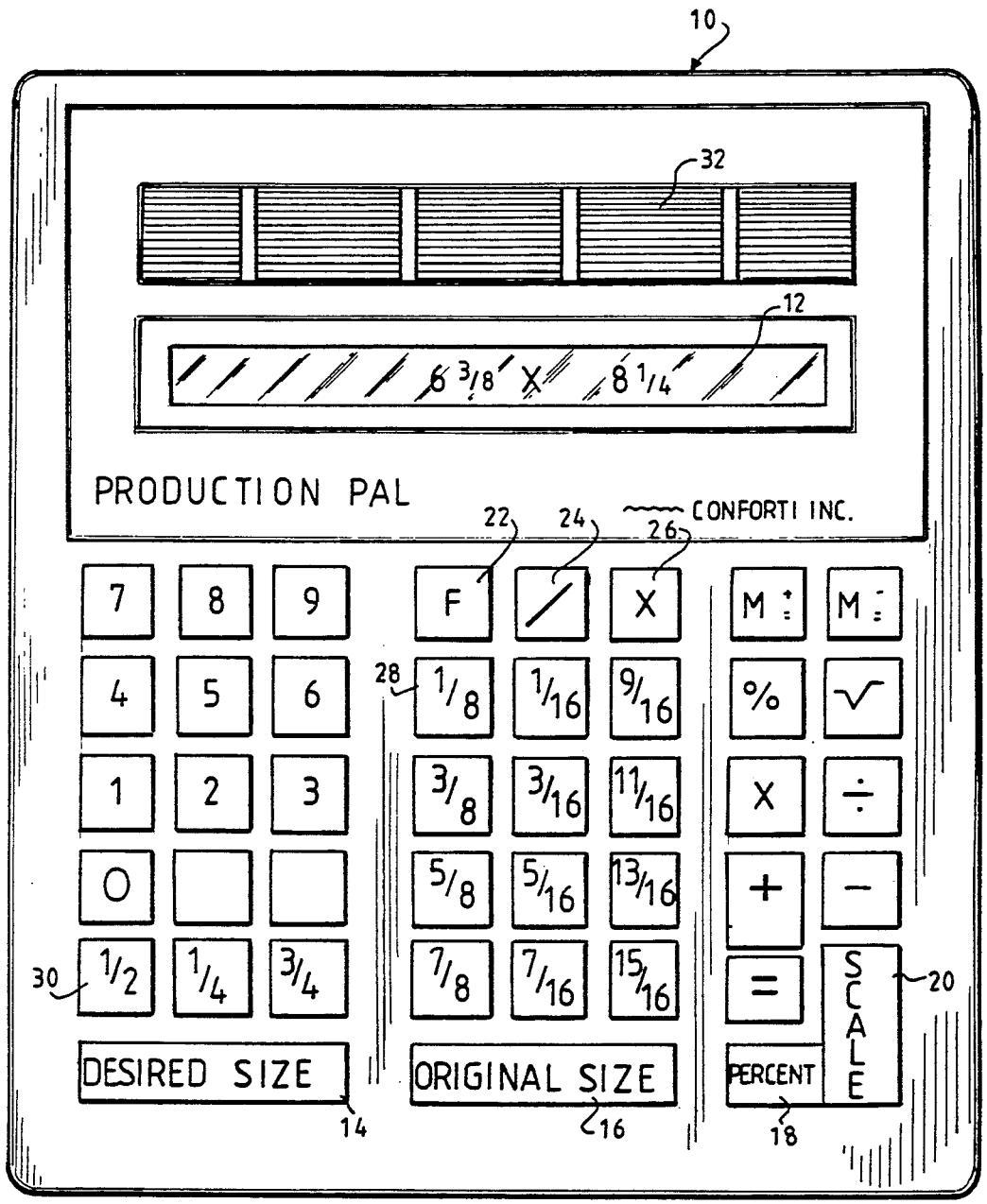
FIG. 1 is a top view of the invention showing a fractional result on the display.

As illustrated in FIG. 1, the invention is physically similar to a conventional calculator except that the display 12 displays fractional results of lengths or rectangular measurements and the addition of special fractional computation keys. These special keys include a DESIRED SIZE key 14 which allows a user to input the size he is trying to achieve (in fractional form), an ORIGINAL SIZE key 16 which allows the user to specify the original length or rectangular measurements (also in fractional form), a PERCENT key 18 which allows the user to specify a scaling factor as a percent, and a SCALE key 20 which performs the same function as PERCENT key 18 except in numerical form. The "F" key 22 is used to separate the fractional complement of a number from the digits that precede it. The "/" key 24 is used to separate the denominator of a fraction from the numerator. The "X" key is used to separate the rectangular dimensions, i.e., length X width. Common fraction value keys such as the $\frac{1}{2}$ key are provided. For example, to input a measurement such as $8\frac{1}{2}''\times 11''$ the following keystroke sequence is used: 8 F 1 / 2 X 1 1. Alternatively, the "$\frac{1}{2}$" key 30 could have been substituted for the three keystrokes 1 / 2.

The remainder of the keys perform functions performed by conventional calculators. A solar battery provides power for the invention.

The detailed internal operation of the invention is best understood with reference to FIGS. 2 and 3. The computations for the invention are executed by central processor unit 40 which accepts as input data from keyboard 42. As mentioned, the keyboard contains a number of fractional computation keys in addition to the standard keys.

The algorithms that are executed by central processor unit 40 are stored in a read only memory 44. This memory may be mask programmed (ROM), or programmed using a programmable read only memory (EPROM), or may be made electrically reprogrammable using an electrical erasable programmable read only memory (EEPROM).

In order to store the intermediate and final results of calculations a random access memory 46 is provided. This memory may be a static random access memory (SRAM) or a dynamic read only memory (DRAM) which requires refresh. The output of the central processor unit 40 is input to display driver 48 which provides the necessary signals to display 12. This display may be a liquid crystal display, a light emitting crystal display, and electroflourescent display, a gas plasma display, or any other display suited to the application.

Unlike conventional calculators, the instant invention provides automated conversions of fractions to decimals and vice versa using a fractional computation unit (FCU) 50 which is detailed in FIGS. 3A and 3B. In FIG. 3A the fractional data is input to fractional conversion data lookup table 52. The lookup table provides a unique digital output for any fractional input and latches that data into digital register 54. Similarly, in FIG. 3B the digital data is input to fractional conversion data lookup table 56. The lookup table provides a unique fractional output for any digital input and latches that data into fractional register 58.

Since the central processor unit 40 only handles digital signals, wherever a fractional input or output is needed, the processor unit 40 accesses the fractional computation unit 50 so that the processor only sees digital signals and directs fractional signals to display 12.

The functional operation of the invention is best understood with reference to FIG. 4 which shows the key stroke sequence on the left and the resulting display on the right.

In FIG. 4, example A, the original size is $8\frac{1}{2}\times 11$ and is to be scaled by the fraction $\frac{3}{4}$. The keystroke sequence produces a result of $6\frac{3}{8}\times 8\frac{1}{4}$. Note that if the result produced a fractional result not exactly representable by a proper fraction lookup tables 52 and 56 provide a close approximation in proper fractional form.

In FIG. 4, example B, the desired size is $6\frac{3}{8}\times 8$ and the original size was $8\frac{1}{2}\times 11$. Depressing the SCALE key produces the scaling factor of $\frac{3}{4}$. Likewise in example C, instead of depressing the SCALE key, the PERCENT key produced a result of 75%. Example D illustrates that keystrokes can be saved by inputting common fraction directly instead of inputting numerator, fraction bar, and denominator separately.

FIGS. 5 and 6, illustrate the use of the Production Pal to manipulate data where a single dimension is of concern. In example A, the original size is 10 and the desired size is 4. The resulting percentage reduction is 40%. Similarly in example B, the original size is $10\frac{1}{2}$ and the desired size is 4. The resulting percentage reduction is 73.8%. In FIG. 6, the original size (10.5) and the desired size (7.75) are known. The resulting percentage reduction is 73.8%.

While certain novel features of the this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. A Fractional/Decimal converting calculator, comprising:
   a) a central processor unit;
   b) a display driver whose input is the output of said central processing unit;
   c) an electronic display controlled by said display driver, said display is a liquid crystal display, a light emitting diode display, an electroflourescent display, or a gas plasma display;
   d) a read only memory that contains the operating algorithms to be executed by said central processing unit;
   e) a random access memory that stores intermediate and final results produced by said central processor unit;

f) a fractional computation unit that performs the digital-to-fractional conversions and fractional-to digital conversions, said fractional computation unit includes a fractional conversion lookup table that outputs a digital input for every fractional input programed into said lookup table and a digital register to store the digital output of said table and another fractional conversion looking table that outputs a fractional output for every digital input programed into said table;

g) a keyboard that provides input to said central processor unit wherein fractional data is input via said keyboard, is converted to digital form by said fractional computation unit, is acted upon by said central processor unit according to algorithms stored in said read only memory, and whereby intermediate and final results are stored in digital form in said random access memory, whereby the digital form is converted to fractional form by said fractional computation unit, and whereby this fractional result is visually output on said display via said display controller, said keyboard containing standard keys found on conventional calculator keyboard and fractional computation keys, said fractional computation keys include DESIRED SIZE key that alerts said central processor that the forthcoming data corresponds to the desired size of a space; and ORIGINAL SIZE key that alerts said central processor that the forthcoming data corresponds to original size of said space; a PERCENT key that alerts said processor that the data is to be scaled by a factor represented as a percent; a SCALE key that alerts said processor that the data is to be scaled by a factor represented; and h) a keyboard that provides input to said central processing unit wherein fractional data is input via said keyboard is converted to digital form by said fractional computation unit, is acted upon by said central processor unit according to algorithms stored in said read only memory and whereby intermediate and final results are stored in digital form in said random access memory, and whereby this digital result, expressed in decimal form, is visually output on said display via said display controller.

2. A calculator, as recited in claim 1, further comprising a solar battery to provide power.

3. A calculator, as recited in claim 1, further comprising a solar battery to provide power.

4. A calculator, as recited in claim 1, wherein said fractional computation unit further comprises
a fractional register to store the fractional output of said another table.

5. A calculator, as recited in claim 1, wherein said keyboard contains standard keys found on conventional calculator keyboard and fractional computation keys.

* * * * *